July 30, 1968   G. O. WALTER   3,395,264
MARKING APPARATUS
Filed May 3, 1965   2 Sheets-Sheet 1
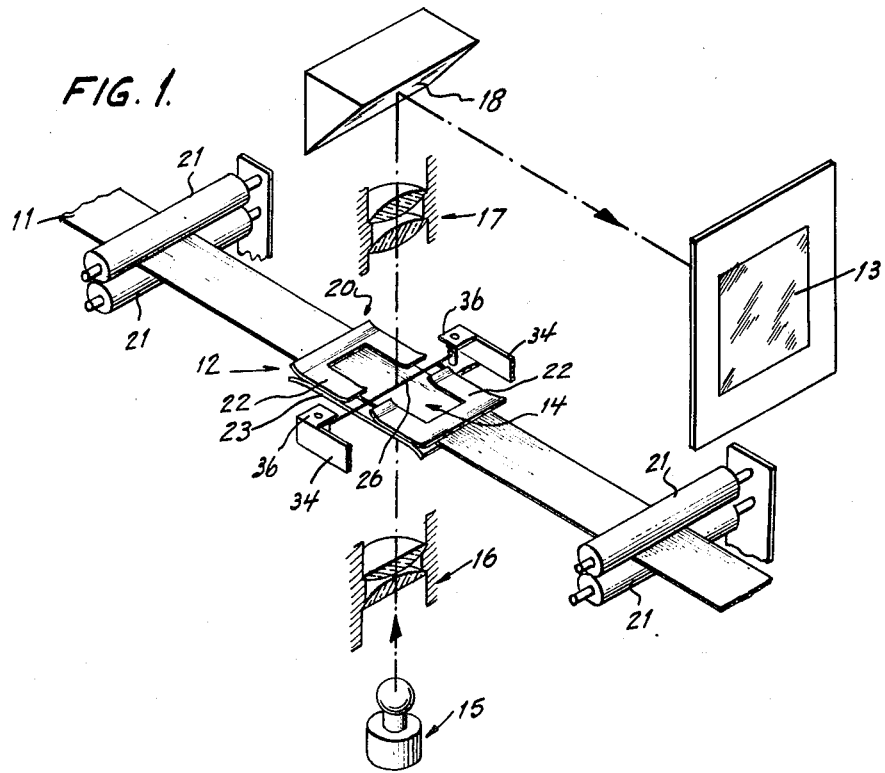
FIG. 1.
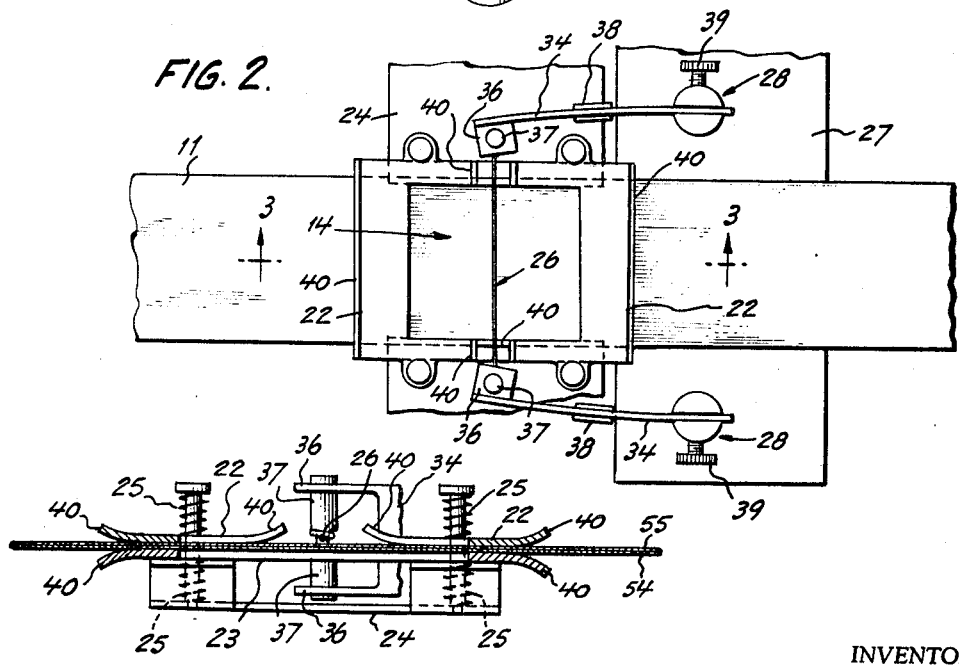
FIG. 2.
FIG. 3.
INVENTOR.
GERARD O. WALTER
BY
C. H. Miranda
ATTORNEY July 30, 1968  G. O. WALTER  3,395,264
MARKING APPARATUS Filed May 3, 1965  2 Sheets-Sheet 2

INVENTOR.
GERARD O. WALTER
BY
C. M. Miranda
ATTORNEY

United States Patent Office 3,395,264
Patented July 30, 1968

3,395,264
MARKING APPARATUS
Gerard O. Walter, Westbury, N.Y., assignor to Sperry Rand Corporation, New York, N.Y., a corporation of Delaware
Filed May 3, 1965, Ser. No. 452,757
6 Claims. (Cl. 219—201)

ABSTRACT OF THE DISCLOSURE

An apparatus for marking or obliterating selected portions of photographically reproduced documents wherein a web of microfilm is transported through a work station at which time the images contained thereon are projected onto a screen. Disposed at the work station is a wire type heating element whose image is also projected onto the screen so that its position relative to the images on the microfilm is easily observed. When the film is to be marked or have portions of the images appearing thereon obliterated, the heating element is energized to a temperature which melts the emulsion on the microfilm. On cooling the microfilm the emulsion solidifies and the microfilm is marked at the selected position.

The present invention relates in general to marking apparatus and more particularly to apparatus for producing marks on selected portions of photographically reproduced documents.

It is common in the information storage art to record a plurality of images on a web of microfilm and then store such film until some future date, when it is necessary to refer to a particular image, to retrieve the film to view the images thereon. The need often arises for the information embodied in the images on the retrieved film to be updated. For example, when the images on the film are minified copies of documents such as bookkeeping records, letters, schedules of transportation departures and arrivals, schedules of tariffs or the like, it often becomes necessary to change the documented information by selectively obliterating one or more lines, or by selectively adding a mark over or adjacent to the information. One presently known-to-the-art procedure of making such changes is to correct the original document, from which the microfilmed image has been derived, and to then re-microfilm the corrected original document and replace the incorrect image with the correct version. Since each individual image usually forms part of a continuous roll of microfilm containing several thousand images, the correction of a single line on one particular image becomes a costly procedure in that splicing of a single image into a roll sometimes is not practical and it is necessary to rephotograph several thousand images for creation of a new roll of film with just one corrected image. To eliminate the necessity of reproducing an entire roll there has been some efforts in the past to make corrections to individual images on the roll by mechanically obliterating or crossing out selected areas by means of a writing instrument. These efforts have encountered difficulties due to the fact that ordinary microfilm consisting of an acetate or other plastic base with a modified gelatin emulsion, which has been hardened during the processing of the film, does not lend itself to the inscription of a distinct mark due to the inherent brittleness of the emulsion. Further difficulties have been encountered in the past when inscribing corrective marks on microfilm due to the necessity of initially establishing the incorrect area that the marking instrument is to engage within a tolerance of one thousandth of an inch in some instances.

It is, therefore, an object of this invention to provide improved marking apparatus for marking sheet material having a heat deformable coating thereon and to overcome the above-mentioned difficulties.

Another object is to provide apparatus for accurately marking predetermined areas of photographically reproduced images.

Still another object is to provide film marking apparatus for selectively obliterating a portion of a photographic record of documented matter for the purpose of efficiently updating such record.

Yet another object is to provide apparatus for marking a predetermined pattern on a selected portion of a particular image on a roll of microfilm, while such image is illuminated and magnified in the read area of a microfilm reading device.

A further object is to provide apparatus for obliterating selected filmed images by removing the image containing portion of the film without damaging the base of the film.

A still further object is to provide a method of selectively removing images from microfilm by obliterating portions of the microfilm while it is being observed in a microfilm reader.

Yet a further object is to provide a method of obliterating images on microfilm by selectively melting portions of the microfilm emulsion.

The present invention is directed to a method of and an apparatus for accurately positioning heat radiating means adjacent the path traversed by a web of film and which radiating means are provided with energization means of sufficient magnitude to effectively mark selected images contained by the film emulsion. According to a preferred embodiment, the invention contemplates the provision of apparatus comprising a heating element as for example an electric resistance wire mounted in close proximity to the portion of a conveyed microfilm bearing images to be marked or obliterated and means for passing controlled electric current through the resistance wire, whereby the heat emitted therefrom melts the microfilm emulsion adjacent thereto while not affecting the microfilm base. The preferred embodiment further contemplates provision of means for accurately positioning the resistance element relative to the conveyed microfilm and which means includes magnifying and illuminating devices of the nature employed in conventional microfilm reading apparatus. The resistance wire is mounted in the optical path of the illuminating source for the reader and in close proximity to the images being illuminated and magnified, thereby providing an optical image of the resistance wire in direct relation to the images carried by the microfilm. The resistance wire is energized when it is desirous to mark or obliterate a microfilmed image which appears superimposed with the image of the wire of the microfilm reader screen.

The foregoing and other objects, features and advantages of the invention will appear more fully hereinafter from a consideration of the detailed description which follows, considered in conjunction with the accompanying drawings wherein one embodiment of the invention is illustrated by way of example. It is to be expressly understood, however, that the drawing is for illustrative purposes only and is not to be construed as defining the limits of the invention.

In the drawing wherein like reference characters refer to like parts through the several views:

FIG. 1 is a diagrammatic illustration in perspective of the novel film marking apparatus comprising the present invention;

FIG. 2 is a partial plan view of the apparatus;

FIG. 3 is an enlarged vertical section taken along line 3—3 of FIG. 2;

Figure 4:
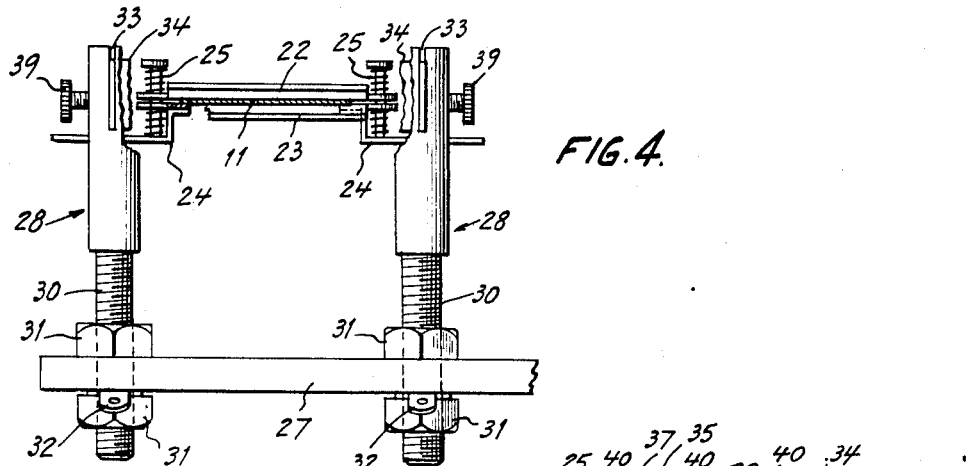
FIG. 4 is a partial end elevation view of the apparatus shown in FIG. 2.

Referring now to the drawing for a more detailed description of the present invention, and more particularly to FIG. 1 wherein one embodiment thereof is clearly illustrated schematically, a section of microfilm, generally designated by the reference numeral 11 and hereinafter referred to as film, is shown as it is conveyed through a portion of a microfilm reading device which includes a general arrangement of the novel marking means and mounting structure therefor, the latter arrangement being generally designated by the reference numeral 12. The microfilm reading device is conventional inasmuch as the optical system, screen and film drive is concerned. It is to be understood that the structure schematically shown in FIG. 1 is intended to be adapted for mounting on a framework within a microfilm reader casing or enclosure. The optical system comprises means for displaying magnified and illuminated microfilm images on a rear projection screen 13. The particular image that is displayed is determined by the image present on the portion of the microfilm outlined by the aperture 14, discussed in detail hereinafter. The aperture is incorporated in an optical system comprising light source 15, which projects light through a condensing assembly 16 into lens assembly 17, which light is then deflected by mirror 18 to the rear projection screen 13. A pressure plate assembly 20 which has an aperture defined therein, is interposed in the main path of the optical system between the condensing assembly 16, and the lens assembly 17. Rollers 21 are provided to keep the film under tension by means of associated friction clutches (not shown), or other means known in the microfilm conveying art. Conventional drive means (not shown) are employed to convey the film through the rollers. The particular image outlined by aperture 14 depends on the selection made by an operator who energizes the drive means for conveying the film; however, for the purpose of this portion of the description it is to be assumed that the operator has selected a particular image and stopped the drive means in accordance with such selection. The projected light is thereby passed through the selected image, which image is magnified and projected on the rear projection screen 13, and thus the image is visible to the operator who is physically disposed on the front side of the screen 13. Many arrangements are possible for producing the prescribed optical effect and the particular arrangement described above has been chosen merely for illustrative purposes.

With regard to the pressure plate assembly 20 two upper members 22 and one lower member 23 (FIGS. 1 and 3) are provided. The upper members 22 have a substantially U-shaped configuration and are disposed coplanar in face-to-face fashion to form a rectangular frame. The lower member is generally rectangular and in the form of a similar frame having an aperture (not shown) which registers with aperture 14 defined by the upper members 22. The upper and lower members are mounted on support elements 24 (see FIGS. 2, 3, 4, and 5) and are gently urged toward each other by compression spring assemblies 25, or the like, with a force which enables the film 11 to pass unimpeded therebetween while at the same time the force is sufficient to prevent curling of the film. The film straightening or curl preventing function performed by the plates is a condition which must be satisfied in the projection aperture of all microfilm reading devices because if the film is allowed to curl, buckle or in any way present an uneven surface in the aperture, then a uniformly sharp image display is impossible. To further the smooth passage of the film between the plates a resilient surface facing may be provided in the form of a pad attached to the contact surfaces of the pressure plate assembly 22 and 23.

The schematic illustration at FIG. 1 further shows a heater element 26 which is of the thin resistance wire type as described in further detail hereinafter. The heater element 26 is disposed between the ends of the upper members 22 of the plate assembly 20 in a manner whereby it is adjacent to the film 11 being conveyed between the plates but the element is necessarily not in contact therewith. The heater element 26 is connected to electrical energization means (discussed below) which provides current pulses therethrough of a sufficient magnitude to cause the element to emit heat at a temperature above the melting point of all conventional film emulsions. The positioning of the heater element 26 in the optical path permits an image of the element to appear on screen 13, thus it is a feature of this invention to provide apparatus in which the microfilm image and the image of the heater element appear simultaneously on the viewing screen in a superimposed fashion. Selective energization of the element is made by the operator when the image of the element apears superimposed over area of the image to be obliterated.

Figure 5:
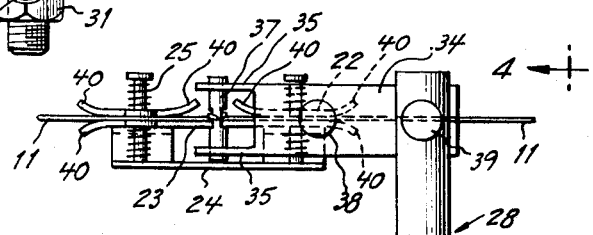
FIG. 5 is a side elevation view of the apparatus shown in FIG. 2.

FIGS. 2, 4, and 5 show a preferred embodiment of the heater element mounting assembly and the pressure plates associated therewith, and which assembly extends from mounting plate 27 secured in a conventional manner to the main framework (not shown) of the microfilm reader with which it is associated. The mounting plate 27 is made from a non-conductive material as (for example) phenolic impregnated fibers. The pressure plate assembly, comprising upper members 22 and lower member 23 urged against film 11 by compression spring assemblies 25, also is secured to the main framework of the microfilm reader via support elements 24 in a well known manner. More specifically the heater element mounting assembly includes two parallel electrically conducting terminal posts 28 extending from mounting plate 27 (see FIG. 4). The terminal posts are provided with threaded end portions 30 for adjustably securing same to the mounting plate 27 by means of a pair of nuts 31. One nut of each pair is secured in opposing fashion on either side of the mounting plate whereby the terminal posts 28 may be adjusted by loosening one and tightening the other a corresponding amount, the accuracy of such adjustment of course depending upon the resolution of the threading employed. Lugs 32 are provided at each post for electrical connections necessary for energization of the heater element.

The non-threaded end of each terminal post is provided with a diametric slot 33 (see FIG. 4) substantially parallel to the path of travel of film 11. A tension leaf 34 is secured at one end in each slot 33 by thumb screw 39 and extends therefrom as illustrated in FIG. 2. A necessary requisite for the tension leaves 34 is that they be made from a resilient material having current conducting properties, e.g., beryllium copper, spring tempered brass, or the like. Referring now to FIG. 5, tension leaves 34 are bifurcated at their other ends to provide thin finger portions 35 from which pairs of conducting ears 36 (see FIG. 2) extend. Heater element mounting rods 37 are physically mounted between the ear pairs, which rods 37 are suitably notched between their ends for receiving the heater element 26, which is of the thin wire variety such as tungsten. Rivets 38 may be provided approximately midway on each tension leaf spring 34 to facilitate consistent uniform flexing of same.

Referring again to FIG. 5 it is seen that by adjusting nuts 31 the relative position of rods 37 can accurately be determined with respect to the path of travel of film 11, and thus, heater element 26, which is mounted under tension between rods 37, can likewise be accurately positioned adjacent the surface of the film because the position of the film as it passes the heater element is determined by pressure plate assembly 20 which as shown in FIG. 1 comprises upper members 22 and lower member 23 which are urged toward each other as described hereinabove. To facilitate passage of the film through the pressure plate assembly, the upper and lower members are provided with curved leading and receiving edges 40 as clearly shown in FIGS. 3 and 5.

Now referring to FIG. 2 the heater element 26 extends between the opposing curved edges 40 of the upper members 22. Tension is initially introduced into the heater element 26 by twisting terminal posts 28 to provide a slight deflection in the leaves, which deflection will vary when the length of the element changes during use, i.e., expansion during heating and contraction when cooling to its ambient temperature. The heating is effected by supplying power at lugs 32 for providing suitable current flow through the wire. Electrical continuity is provided between lugs 32, i.e., terminal post 28, ears 36, and rods 37 are all electrically conductive and as such are in series.

Figure 6:
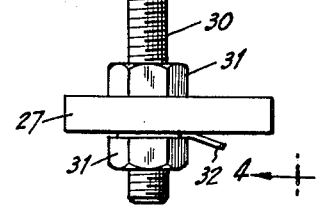
FIG. 6 is a schematic diagram of the resistance wire energization circuit.
Figure 6:
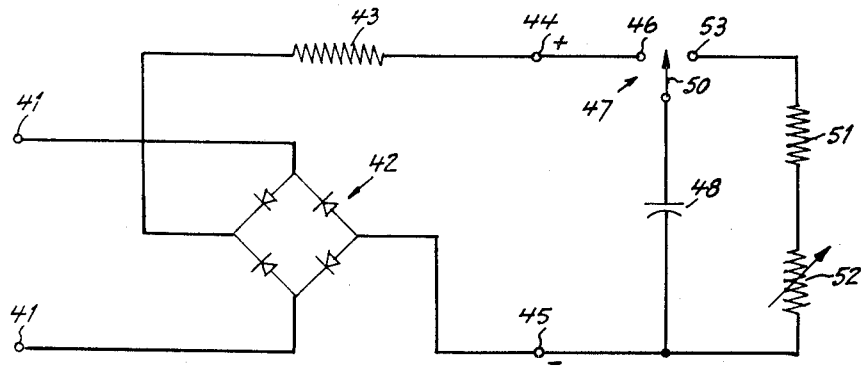

FIG. 6 shows a schematic diagram of one arrangement of electrical elements that may be employed for energization of heater element 26. The power source comprises input terminals 41, full wave rectifier 42, series resistor 43, and positive and negative output terminals 44 and 45. The positive output terminal 44 is connected to one stationary contact 46 of SPDT switch 47 and the negative output terminal is connected to one side of a capacitor 48, the other side of which is connected to the movable contact arm 50 of the switch. The resistance of heater element 26 is represented by resistor 51 and is serially connected to variable resistor 52, which series arrangement is connected between the negative output terminal 45 and the other stationary contact 53 of SPDT switch 47.

For the purpose of illustration, and based on the assumption that film 11 is a commercially available 16 mm. film comprising a conventional heat sensitive emulsion coated on a transparent base, and an ordinary 115 volt, 60 cycle power is applied to the output terminals; exemplary values for the electrical elements are as follows: the full wave rectifier 42 comprises four type IN539 diodes; series resistor 43 is a 1 watt 200 ohm resistor; capacitor 48 is a 200 volt 166 microfarad capacitor; resistor 51 is a tungsten wire element two inches long, having a diameter of two mills, and a resistance value of 1.4 ohms, and variable resistor 52 is rated at ½ watt and is variable at 100 ohms. These values were also dependent on the length of the heating cycle required, which will be discussed in further detail in the description of the operation, and the heating cycle itself is in turn dependent upon the type of film, i.e., the properties of the emulsion. For example, if the melting point of the film emulsion is 300° F., and the heating element is of the tungsten wire type then a heating cycle duration of 20 milliseconds is sufficient when the element is mounted .002 inch from the surface of the film.

The basic operation of the energization circuit is one in which the switch 47 remains in the position shown (referred to hereinafter as the first position) unless and until the operator wishes to energize the heater which is represented in FIG. 6 by resistor 51, at which time the contact arm 50 is moved to stationary contact 53 (referred to hereinafter as the second position). In the first position capacitor 48 is connected directly across output terminals 44 and 45, and is charged to the potential thereacross when an A.C. power source is connected to input terminals 41. When the switch 47 is moved from its first position under charged capacitor conditions, to its second position, capacitor 48 discharges through variable resistor 52 and resistor 51. The discharge time constant which determines the heating cycle, depends on the values of capacitor 48 and the total resistance of variable resistor 52 and resistor 51. In deriving such time constant the value of resistor 51 is insignificant relative to variable resistor 52 insofar as resolution is concerned, thus, the heating cycle can be changed according to the product of the selected value of variable resistor 52 and the value of capacitor 48.

To recapitulate, the function of the circuitry shown in FIG. 6 is to energize resistor 51, which represents the heater element 26 (see FIG. 1 for example). The heat emitted by the heater element is a function of the power output of its resistance, represented by resistor 51, thus when the necessary heat requirements are determined by the melting point of the particular emulsion on the film employed, proper selection of resistive and capacitive components enable the exponential discharge of current through resistor 51 to be derived for providing sufficient average power. It should be noted that a time limited heating cycle, such as that described above, prevents overheating, which would damage the plastic base of the film and lead to eventual film breakage at such damaged, and thus weakened, area. The timing cycle involved in the present invention may be measured in fractions of thousandths of a second and thus, in addition to obviating damage to the film base, the width of the strikeout line can be accurately controlled.

In a typical operation of the disclosed apparatus, film 11 (referring to FIG. 1) is conveyed through rollers 21 and between pressure plate assembly 20 by a conventional microfilm reader drive means (not shown). As the microfilm images pass through the aperture defined in the upper and lower members 22 and 23 of pressure plate assembly 20, they are magnified and projected on screen 13 for visual display to the operator. Heater element 26 is disposed in close proximity to the emulsion coated side of film 11 and the image of such element appears on the screen superimposed over the images on the microfilm to which it is adjacent. The physical relationship of the element and film is clearly illustrated at FIG. 3, where the film (shown in cross-section), comprising a transparent base web 54, such as cellulose acetate, and an emulsion coating 55, such as silver-halide, is shown disposed between upper members 22 and lower member 23 of the pressure plate assembly. Heater element 26 has a typical diameter of .002 inch and is stretched transverse to the emulsion coated surface at a distance of .002 inch, which distance may be set with a high degree of accuracy. When the operator energizes the heater element (in accordance with a desired deletion of images appearing on the screen superimposed with the image of the heater), a controlled cycle of heat is applied to the heat sensitive emulsion such that a narrow strip of same is melted to the extent necessary to obliterate the images in a manner that they appear to be striken out but still can be deciphered. After having so altered the film it can be removed from the reader and stored for future use.

In view of the similar heeat sensitive properties of all microfilm emulsion one advantage of the present invention is that it is equally suited for use with many presently known-to-the-art media of microfilm. A further advantage of the present invention is the ability to accurately mark or obliterate microfilm images, due to its adaptability for use with magnification and illumination means in conventional microfilm reading apparatus without substantially modifying same. These and many other advantages are felt to be readily apparent to a skilled artisan when considering the features of the above described novel structure.

Although a specific embodiment of the invention has been illustrated and described in detail by way of example, it is to be expressly understood that the invention is not limited thereto; various changes may be made in the design and in the arrangement of parts without departing from the spirit and scope of the invention as defined by the appended claims as will now be understood by those skilled in the art.

What is claimed is:

1. In a marking apparatus,
a photographic record of printed matter having a predetermined melting point,
a heater element;
means for mounting said heater element in proximity to the printed matter carried by a selected portion of said photographic;
means for displaying an image corresponding to the printed matter carried by the selected portion and to the heater element; and
means for selectively energizing said heater element to emit heat at a temperature above the melting point of the selected portion of the photographic record, whereby said record is marked at the selected portion when said element is energized and when said portion is displayed in proximity to said element.

2. A device for selectively marking microfilmed images comprising:
an image bearing web of microfilm,
an electrical resistance element for emitting heat;
a two position switch connected in circuit with said electrical resistance element;
means for conveying the microfilm in a predetermined path;
means for mounting said element adjacent said path;
optical means for displaying the images appearing in the emulsion of said microfilm adjacent to said element and the image of said element; and
means for providing unidirectional power for a predetermined period;
electrical connecting means interconnecting said unidirectional power, said element and said switch;
said switch interconnected in a first position for no current flow through said element, and interconnected in a second position for current flow through said element for said predetermined period at a magnitude providing emission of heat at a temperature exceeding the melting point of the microfilm emulsion and thereby marking the image appearing thereon.

3. In a microfilm reader having means for displaying photographed images on the microfilm when a portion of the microfilm is illuminated and magnified in a read area, a device for selectively marking the images comprising:
an electrical resistance heating element;
a capacitor;
a source of unidirected power;
switch means having two positions of operation, said switching means comprising means connecting said source of unidirected power across said capacitor for charging said capacitor to a predetermined energy level in the first position of operation, and means for connecting said electrical resistance heating element in series with said capacitor for providing a discharge path for said capacitor in the second position of operation;
a variable resistor connected in series with said electrical resistance heating element for varying the discharge time constant of said capacitor; and
means for mounting said heating element in the read area adjacent the displayed portion of the microfilm whereby an image of the heating element is displayed in its physical relation to the displayed microfilm images;
said resistance heating element, said variable resistor and said capacitor being selected to provide a time constant of a sufficient duration to permit the heating element to be energized for at least a predetermined time interval during which heat is emitted at a tmperature above the melting point of the microfilm emulsion after said switching means is switched from its first position to its second position to provide a mark on said microfilm adjacent said heating element.

4. A marking apparatus comprising;
a photographic record of printed matter having an emulsion coating with a predetermined melting point;
an electrical resistance element for emitting heat;
means for mounting said resistance element;
means for conveying said photographic record in a predetermined path in the proximity of said resistance element; and
means for selectively energizing said resistance element to produce heat at a temperature above the melting point of the emulsion of the photographic record to provide a mark on a selected portion of said record;
said means for mounting said resistance element including spaced electrically conducting arms disposed on opposite sides of said pre-determined path for supporting said resistance element transverse thereof, said arms being adapted at one end for electrical connection to said energizing means and at the other end for electrical and physical connection to said resistance element;
said arms being flexible and initially deflected for mounting said resistance element under tension.

5. A device for selectively marking a web of microfilm comprising;
a web of microfilm having a coating of emulsion with a predetermined melting point
an electrical resistance element for emitting heat;
resistance element mounting means;
means energizing said resistance element for emitting heat at a temperature above the melting point for the microfilm emulsion;
means for conveying said web in a path adjacent said resistance element, causing said microfilm emulsion to pass in close proximity to said resistance element and selectively melt when said element is energized;
said resistance element mounting means including first and second pressure plate units, said first pressure plate unit being substantially rectangular and having a rectangular aperture therein, said second pressure plate unit comprising two substantially identical members of U-shaped configuration arranged to frame an aperture having the same dimensions as the aperture in said first pressure plate unit;
said first and second pressure plate units disposed on opposite sides of said path and urged against opposite sides of the conveyed web with said apertures aligned;
said resistance element mounting means further including means for securing said element in a suspended position between and on the same side of the path as said U-shaped members; and
optical means for displaying the resistance element image and the microfilm images framely by said aperture whereby the melted portion of the emulsion appears as a mark corresponding to the configuration of the element.

6. A method of marking microfilm, the steps comprising;
conveying a microfilm web base, having a heat deformable coating, along a predetermined path to a marking station;
positioning an energizable heater element at said marking station in proximity to the heat deformable coating;
energizing said heater element to a temperature in excess of the melting point of the heat deformable coating; and projecting onto a screen an image of the microfilm within the marking station having superimposed thereon the image of the heater element;

removing the energization from said heater element after a predetermined period of time has elapsed during which said coating is marked in accordance with the deformation thereof.

References Cited

UNITED STATES PATENTS

| | | | |
|---|---|---|---|
| 2,742,631 | 4/1956 | Rajchman et al. | 340—173 |
| 3,055,006 | 9/1962 | Dreyfoos, et al. | 346—74 |
| 3,125,741 | 4/1964 | Kenneally | 340—24 |
| 3,155,451 | 11/1964 | Dunster et al. | 346—1 |
| 3,262,122 | 7/1966 | Fleisher et al. | 346—1 |
| 3,284,196 | 11/1966 | Mazza | 340—173 X |

RICHARD M. WOOD, *Primary Examiner.*

C. L. ALBRITTON, *Assistant Examiner.*